(12) United States Patent
Gilmour et al.

(10) Patent No.: US 8,874,720 B2
(45) Date of Patent: Oct. 28, 2014

(54) APPARATUS AND METHOD FOR MONITORING A TELECOMMUNICATIONS NETWORK

(75) Inventors: Bruce Gilmour, Fife (GB); Donald MacGregor Scobbie, Edinburgh (GB); Gavin David Lauchlan, Fife (GB); Stuart Edward Thomson, Edinburgh (GB)

(73) Assignee: JDS Uniphase Corporation, Milpitas, CA (US)

( * ) Notice: Subject to any disclaimer, the term of this patent is extended or adjusted under 35 U.S.C. 154(b) by 1544 days.

(21) Appl. No.: 11/349,018

(22) Filed: Feb. 7, 2006

(65) Prior Publication Data
US 2006/0224732 A1 Oct. 5, 2006

(30) Foreign Application Priority Data

Mar. 30, 2005 (GB) .................................. 0506393.8

(51) Int. Cl.
*G06F 15/173* (2006.01)
*H04L 12/26* (2006.01)
*H04L 12/24* (2006.01)
*H04W 24/00* (2009.01)
*H04W 24/04* (2009.01)

(52) U.S. Cl.
CPC ............ *H04L 41/0631* (2013.01); *H04W 24/00* (2013.01); *H04W 24/04* (2013.01); *H04L 43/12* (2013.01); *H04L 41/00* (2013.01); *H04L 12/24* (2013.01)
USPC ............ 709/224; 709/204; 709/223; 709/225

(58) Field of Classification Search
USPC ......... 709/227, 206, 203, 224, 225, 230, 223; 455/423, 446
See application file for complete search history.

(56) References Cited

U.S. PATENT DOCUMENTS

| | | | | |
|---|---|---|---|---|
| 5,528,677 | A | * | 6/1996 | Butler et al. ................... 379/196 |
| 5,781,735 | A | * | 7/1998 | Southard ........................ 709/224 |
| 5,787,253 | A | * | 7/1998 | McCreery et al. ............ 709/231 |
| 6,131,112 | A | * | 10/2000 | Lewis et al. .................... 709/207 |

(Continued)

FOREIGN PATENT DOCUMENTS

| | | |
|---|---|---|
| GB | 2 342 253 | 4/2000 |
| GB | 2 388 490 | 11/2003 |

(Continued)

OTHER PUBLICATIONS

"IBM Tivoli Monitoring for Messaging and Collaboration: Microsoft Exchange Server"—IBM, Jul. 2004 http://publib.boulder.ibm.com/tividd/td/ITMMC/SC32-9110-00/en_US/PDF/exchg_ug.pdf.*

(Continued)

*Primary Examiner* — Randy Scott
(74) *Attorney, Agent, or Firm* — JDS Uniphase Corporation

(57) ABSTRACT

A method and apparatus for monitoring telecommunications network elements, especially where direct access to those network elements is not available. The invention allows a network manager to build and maintain significant relationship information, as well as model the state of network elements with a high degree of accuracy, but based only on the information contained within the transactions built from the network traffic which is being monitored. In particular, it allows the network manager to obtain the same results that would previously have required direct access to an operator's network elements.

18 Claims, 6 Drawing Sheets

(56) References Cited

U.S. PATENT DOCUMENTS

| | | |
|---|---|---|
| 6,148,337 A * | 11/2000 | Estberg et al. .............. 709/224 |
| 6,470,386 B1 * | 10/2002 | Combar et al. .............. 709/224 |
| 6,801,756 B1 | 10/2004 | Agrawal et al. |
| 6,925,054 B1 * | 8/2005 | Atterton et al. .............. 370/218 |
| 7,304,996 B1 * | 12/2007 | Swenson et al. .............. 370/394 |
| 2002/0143913 A1 * | 10/2002 | Sahita et al. .................. 709/223 |
| 2002/0184365 A1 * | 12/2002 | Lumley ........................ 709/224 |
| 2003/0028631 A1 * | 2/2003 | Rhodes ........................ 709/224 |
| 2003/0046390 A1 * | 3/2003 | Ball et al. .................... 709/224 |
| 2003/0061506 A1 | 3/2003 | Cooper et al. |
| 2004/0030667 A1 * | 2/2004 | Xu et al. ........................ 707/1 |
| 2004/0181599 A1 * | 9/2004 | Kreusch et al. .............. 709/227 |
| 2005/0021736 A1 * | 1/2005 | Carusi et al. ................ 709/224 |
| 2006/0161626 A1 * | 7/2006 | Cardina et al. .............. 709/206 |

FOREIGN PATENT DOCUMENTS

| | | |
|---|---|---|
| WO | 01/98916 | 12/2001 |
| WO | 02/05486 | 1/2002 |
| WO | WO 02/067546 | 8/2002 |

OTHER PUBLICATIONS

European Search Report dated Aug. 10, 2007.

* cited by examiner

APPARATUS AND METHOD FOR MONITORING A TELECOMMUNICATIONS NETWORK

The present invention relates to a method and apparatus for monitoring a telecommunication network having a plurality of users and network elements, especially, though not exclusively, where direct access to those network elements is not available.

BACKGROUND OF THE INVENTION

GPRS (General Packet Radio Service) is a service that provides wireless packet data access to mobile GSM (Global System for Mobile Telecommunications) users. GPRS provides the first implementation of a packet switching technology within GSM, which is, itself, a circuit switched technology. GPRS is also an important precursor for 3G ($3^{rd}$ Generation Mobile Technology) as it implements the packet switched core required for UMTS (Universal Mobile Telecommunications System) networks. Data rates in the order of 115 kb/s can be supported.

One of the main features of GPRS is that it reserves radio resources only when there is such a need and that these radio resources are shared by all mobile subscribers (MS's) in a cell, where a cell is the geographical area covered by a cellular base station.

Therefore, as is the case for all packet data services, effective resource utilization is provided for bursty data applications, such as telemetry, train control systems, interactive data access, toll road charging systems, and browsing the World Wide Web (WWW) using the Internet.

A reference model for a GPRS network, as known in the art, is depicted in FIG. 1. GPRS allows a MS 11 to send and receive data in an end-to-end "packet transfer" mode, without using any network resources in "circuit-switched" mode. This allows for autonomous operation of GPRS and best fits the bursty traffic characteristics. Packet routing is supported by definition of a new logical network node called a GPRS support node (GSN). The GSN is basically a packet router with additional mobility management features and connects with various network elements through standardized interfaces. The GSN node that acts as a physical interface to external Public Data Networks (PDN's) 20, such as operator networks, corporate networks, or the Internet, is known as a Gateway GSN (GGSN) 21. The GSN node that connects with a BSC (Base Station Controller) 14 and directly handles packet delivery to and from MS's 11 is known as a Serving GSN (SGSN) 15.

Each SGSN 15 is responsible for the delivery of packets to the MS's 11 within its service area 10. The BSC 14 is the network entity controlling a number of BTS's (Base Transceiver Stations) 13, which are the network entities which communicate with the MS 11.

An SGSN 15 provides a connection point for subscribers when they want to access services provided by the GPRS network 22. The SGSN 15 downloads the capabilities of the connecting MS 11 from a HLR (Home Location Register) 17, along with information such as security, billing and authentication etc. The HLR 17 is a database within the GSM network 22 which stores all the subscriber-specific data.

Before an MS 11 is capable of using a GPRS service, it must attach to an SGSN 15. Effectively, this attachment corresponds to the establishment of a logical link between the MS 11 and its SGSN 15. The SGSN 15 encapsulates the data packets from the MS 11 and routes them to the appropriate GGSN 21, where they are forwarded to a fixed host inside the correct PDN 20. Specific routing policies are applied inside this PDN 20 to send the packets to the corresponding fixed host; these are known as "routing contexts". After attachment, one or more routing contexts for one or more network protocols can be negotiated with the SGSN 15.

Packets coming from a corresponding fixed host to an MS 11 are first routed to the GGSN 21 through the PDN 20, based on the examination of the destination address. The GGSN 21 checks the routing context associated with this destination address and determines the address of the SGSN 15 currently serving the addressed MS 11. Subsequently, the original data packet is encapsulated into another packet (this procedure is called tunnelling), which is forwarded to the SGSN 15 and ultimately delivered to the correct MS 11.

In order to verify that a given MS 11 is allowed to use a network protocol, the HLR 17 is queried. Among other things, the subscription profile found in the HLR 17 includes the matching GGSN 21 address. If access is permitted, the GGSN 21 is requested to update the routing context (i.e. the SGSN 15 address and tunnelling information) accordingly.

The GPRS backbone network (as defined by links Gn, Gp, and Gi in FIG. 1) is a private IP (Internet Protocol) network. The IP addresses used in this part of the backbone network are selected by the GPRS operator and they are not known outside the backbone network.

Also shown in FIG. 1 is an MSC (Mobile Switching Centre) 16, which is the switching centre of a mobile phone network, a GRX (GPRS Roaming Exchange) 18, which is a point of connection to other GPRS networks, as well as the various links having reference names, as listed below:

A is an interface between the BSC 14 and the MSC 16;
Abis is an interface between the BSC 14 and the BTS 13 (this can be proprietary if the BSC and the BTS are from the same NEM (Network Equipment Manufacturer), which is often the case);
Gb is an interface between the SGSN 15 and the BSC 14, which is likely to be implemented using Frame Relay;
Gi is an interface between the GGSN 21 and the PDNs 20, which is likely to be implemented using IP;
Gn is an interface between the GGSN 21 and the SGSN 15, which is likely to be implemented using IP;
Gp is an interface between the GGSN/SGSN 21, 15 and the GRX 18, which is likely to be implemented using IP;
Gr is an interface between the SGSN 15 and the HLR 17, which is likely to be implemented using SS7 (Signalling System 7); and
Gs is an interface between the SGSN 15 and the MSC 16.

An example of a GPRS protocol is the GPRS Tunnelling Protocol (GTP), which is a transmission protocol to tunnel multi-protocol packets between GSN's. Several subscribers in the supply area of a single SGSN 15 may be simultaneously connected to a PDN 20 via the same GGSN 21. An IMSI (International Mobile Subscriber Identity) is used to uniquely identify each MS 11 in the GPRS network 22.

An MS 11 may also run several applications simultaneously; each of them requiring connection to a plurality of PDNs 20 connected to the same GGSN 21. Therefore each application must also be uniquely identified. A Network Service Access Point Identifier (NSAPI) is used for this purpose. The NSAPI is assigned when the MS 11 requests a call set-up, a process referred to as the Packet Data Protocol (PDP) Context Activation Procedure. A PDP context (i.e routing context) describes the properties of a link between the MS 11 and the GGSN 21, such as which QoS level is used for the transmission etc.

A transaction, as known in the art, is a related exchange between two network elements, for example a transaction could contain all packets that constitute a "GPRS location update" (which occurs when a mobile subscriber moves from one cell to another), or all the messages to do with a MS 11 attaching to the packet-switched network (such as GPRS Attach Request, Attach complete, Create PDP Context Request, Create PDP Context Complete etc). A transaction builder, also as known in the art, uses knowledge of the protocols used in the network (such as the GPRS protocols) to build a plurality of individual traffic messages into a complete transaction.

Currently operators monitor the status of the network by "grabbing" information from the network elements and then storing or displaying it in a variety of ways, using known network management systems. The main reason for operators and manufacturers to collect data is for reasons such as network performance evaluation. Data, such as statistics concerning how many subscribers are connected to the network at any one time, or how many IP tunnels have been created, can be collected from each network element according to a schedule established by a network management system. Such information is normally maintained in MIB (Management Information Base) tables held inside the network elements themselves and is accessible by network management systems using a network protocol such as SNMP (Simple Network Management Protocol), as known in the art.

Operators, for example, also may want to know where a GPRS mobile user was when they encountered a problem accessing a service or had a network outage, so network managers also build "relationships" i.e. tables of data linking items such as the Cell Location ID (CLI) with a subscriber's IMSI, both of which can be extracted from the GPRS protocols operating at the Gb side of a SGSN (see FIG. 1).

Some operators will not allow access to their network elements, switches and routers etc for such monitoring purposes. For example with some switching devices, network management monitoring, such as that which uses SNMP as previously described, "steals" processing power to produce such statistics and thus increases processing loads and reduces the overall efficiency of the network element. This equates to lost revenue for the operators. Also, firewalls may surround the operator's backbone IP networks and allowing network management systems to have access to these networks, is perceived as reducing the overall security of the system.

Currently the required relationship information can be maintained by state machines. The use of state machines requires that all traffic is observed and introduces significant processing overheads. The current prior art does not generally deal with transactions, but with the individual messages that are then combined into a transaction. The state machines used need to "see" every single message from the interactions between network elements, in order to "follow" the progress of a transaction on the network. There are a number of reasons why this is not a satisfactory solution, one of which is the presence of ciphering on some network element interfaces. Prior art state machine solutions therefore must be able to "grab" cipher key messages and distribute them round the system, so that they can be used to decipher messages on the interfaces being monitored. If keys are missed due to hardware failure or network propagation delays, then it is possible that the prior art implementations will be unable to decipher messages and will subsequently not be able to "feed" them to their state machines.

Prior art transaction builders make use of similar technology and suffer similar problems. If messages cannot be deciphered then any implementation will "miss" transactions, because they cannot be built in the first instance. This infrastructure problem means that any implementation may never be presented with all of the transactions that are present in the network.

It is important, therefore, for a network management system to be able to model the state of telelcommunications network elements, such as, but not limited to, those network elements found in a GPRS network, with a high degree of accuracy, using the information contained within the transactions that can be built from the telecommunications network traffic which is being monitored. Furthermore, it is important that monitoring equipment that can passively tap the traffic passing between network elements (such as those found in a GPRS network) and from information "gleaned" from knowledge of this traffic (for example from knowledge of the GPRS protocols and standard transaction formats), can build and maintain the required significant relationships and can model the internal state of network elements (such as GPRS network elements).

In particular, it is important for a network manager to be able to obtain the same results that would previously have needed direct access to an operator's network elements, but without the need for implementing a state machine based solution, using deciphering keys, or by having direct access to those network elements.

The present invention seeks to solve, or at least mitigate, the problems of the prior art by providing a method and apparatus for monitoring a telecommunication network having a plurality of users and network elements, especially, though not exclusively, where direct access to those network elements is not available.

BRIEF SUMMARY OF THE INVENTION

Accordingly, in one aspect, the invention provides an apparatus for monitoring a telecommunications network having a plurality of users and network elements, comprising a network transaction data management module having a first input for receiving configuration information for configuring the module to analyse transaction event data according to predetermined criteria and required result structures, a second input for receiving transaction event data built from related data messages on the network, a processor for analyzing the transaction event data according to the predetermined criteria to produce result information according to the required result structures, a memory for storing the configuration information and the result information, and a result interface for receiving queries, for obtaining appropriate result information for the query from the memory and for outputting the appropriate result information.

In one embodiment the apparatus further comprises a transaction event builder having one or more inputs for receiving data message information from monitoring probes distributed across the network, a compiler for compiling transaction event data from the received data message information based on related data messages and an output coupled to the second input of the network transaction data management module for providing transaction event data.

The transaction event builder may conveniently be at a remote location from the network transaction data management module.

The processor may comprise a global network relationship data manager for analyzing the transaction event data to produce result information comprising global relationships between users based on predetermined global relationship attributes.

The processor may comprise a network element data manager for analyzing the transaction event data to produce result information comprising local relationships for each predetermined network element based on predetermined local relationship attributes.

The processor may comprise a network state variable data manager for analyzing the transaction event data to produce result information comprising state variable values for each predetermined network element.

The apparatus may further comprise a configuration controller for providing configuration information to the network transaction data management module.

The network transaction data management module may further comprise a configuration handler having an input for receiving the configuration information and at least one output coupled to the processor for configuring the processor according to the configuration information.

The apparatus may further comprise an event bus having an input for receiving the transaction event data and being coupled to provide the transaction event data to the network transaction data management module.

The apparatus may further comprise a measurement engine coupled to receive the transaction event data from the event bus for measuring statistics of the transaction event data.

The apparatus may further comprise at least one output formatter coupled to receive the transaction event data from the event bus for providing enriched transaction event data in response to requests therefore.

The apparatus may further comprise at least one source event attribute library coupled to the network transaction data management module and the output formatter, the output formatter requesting the source event attribute library for information regarding the transaction event data and the source event attribute library querying the network transaction data management module to obtaining the appropriate result information from the network transaction data management module and responding to the based on the received appropriate result information.

The output formatter may comprise a feed output formatter and the apparatus may further comprise a measurement output formatter.

The source event attribute library may comprise a factory portion for generating labels for the transaction event data and an access portion for allowing direct access to fields in the transaction event data.

The measurement engine may be coupled to the source event attribute library to enable it to communicate with the network transaction data management module.

According to a second aspect, invention provides a method of monitoring a telecommunications network having a plurality of users and network elements, the method comprising receiving predetermined criteria and required result structures for analyzing transaction event data, receiving transaction event data built from related data messages on the network, analyzing the received transaction event data according to the predetermined criteria to produce result information according to the required result structures, storing the predetermined criteria, the required result structures and the result information, and outputting appropriate result information in response to received queries.

Analyzing the received transaction event data may comprise analyzing the transaction event data to produce result information comprising global relationships between users based on predetermined global relationship attributes.

Analyzing the received transaction event data may comprise analyzing the transaction event data to produce result information comprising local relationships for each predetermined network element based on predetermined local relationship attributes.

Analyzing the received transaction event data may comprise analyzing the transaction event data to produce result information comprising state variable values for each predetermined network element.

BRIEF DESCRIPTION OF THE DRAWINGS

One embodiment of the invention will now be more fully described, by way of example, with reference to the drawings, of which.

DETAILED DESCRIPTION OF THE DRAWINGS

The present invention can be implemented, in one embodiment, as a module within a measurement function (otherwise known as framework) of a network manager that can monitor a telecommunications network, such as but not limited to a GPRS network. The network manager may be implemented on a Unix platform, but it will be obvious to someone skilled in the art that it may also be implemented on any other suitable platform (or operating system).

Figure 2:
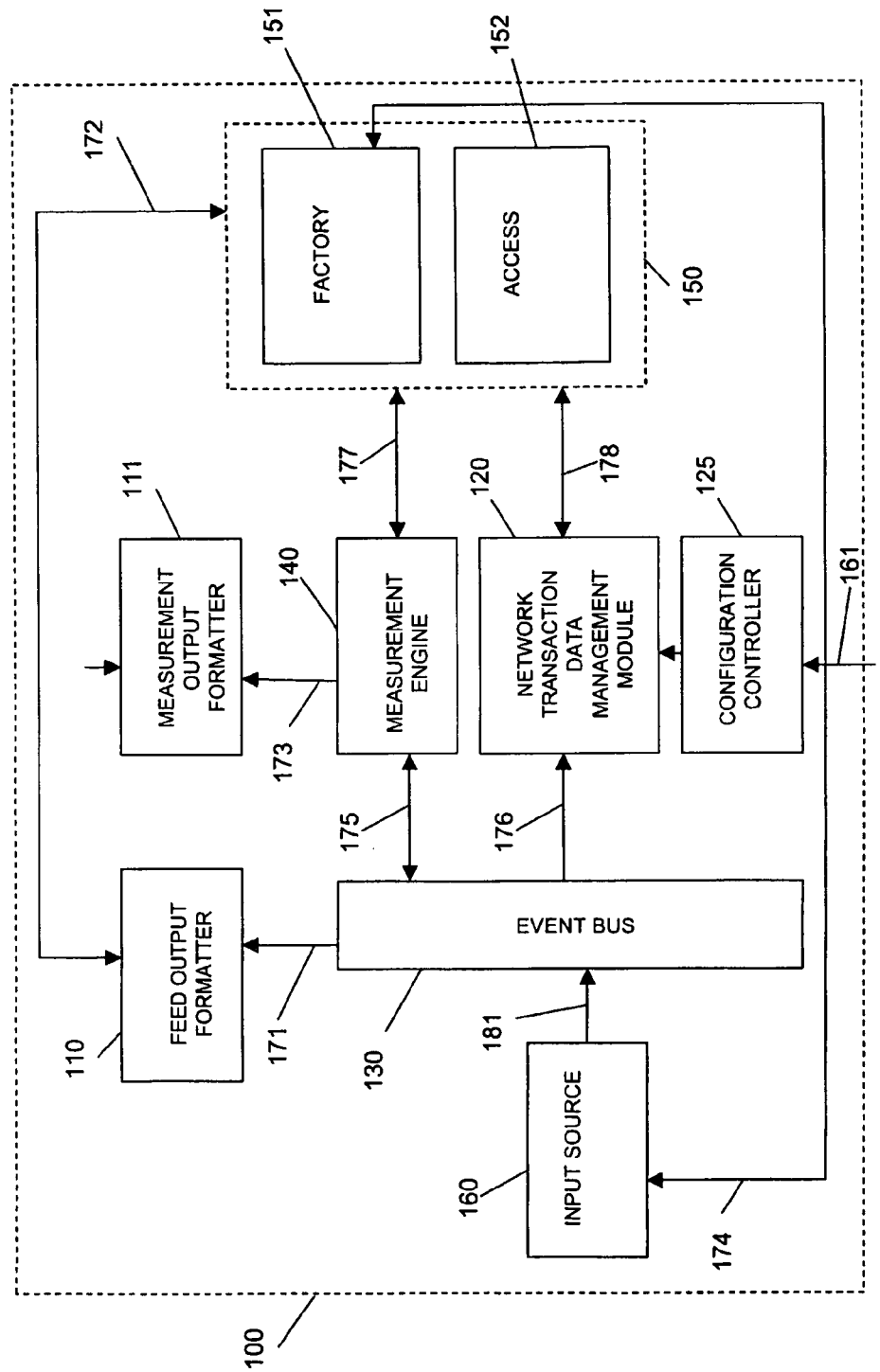
FIG. 2 is a schematic block diagram of a measurement framework of a network manager, including a network transaction data management module according to one embodiment of the present invention.

FIG. 2 shows the logical fit of a network transaction data management module 120 into a measurement framework 100 of a network manager, according to one embodiment of the present invention. The network transaction data management module 120 is initialised and configured by a configuration controller 125, via a configuration input 161, to define the relationships that are to be tracked and the status information to be updated for those network elements that are to be monitored.

The measurement framework 100 further comprises one or more "processing" modules, such as but not limited to: an input source 160; a measurement engine 140; and a plurality of output formatters, such as but not limited to: a feed output formatter 110; and a measurement output formatter 111. The measurement framework 100 also further comprises an event bus 130, as well as one or more "service" modules, such as, but not limited to, source event attribute libraries 150.

The source event attribute libraries 150 provide a number of services to the processing modules, as well as the network transaction data management module 120, such as, but not limited to: "wrapping" the incoming raw data objects; providing access to the data within the incoming raw data objects; and providing a translation function on the incoming raw data objects. The source event attribute libraries 150 can be seen as being logically implemented as two separate functions: a factory part 151, which creates representations, or labels; and an access part 152 which allows direct access to fields in the incoming transactions as described. The source event attribute libraries 150 are logically coupled to the feed output formatter 110, the network transaction data management module 120 and the measurement engine 140, via logical "get request" links 172, 178 and 177 respectively. A person skilled in the art will understand that a get request link has an implied return path, as shown by double-headed arrows in FIG. 2. The services provided by the source event attributes libraries 150 are known in the art.

The input source 160 is logically coupled to the event bus 130, via link 181 and is arranged to handle the incoming transaction events from the network. The input source 160 uses the factory part 151, via link 174, to "wrap" raw data objects and then "publishes" them to the event bus 130 via link 181 as "wrapped data objects". These wrapped data objects are then made available to all other processing modules of the measurement framework 100, as well as the network transaction data management module 120.

Those skilled in the art will understand that "object" is a term used in object-orientated computer programming languages and refers to a small set of instructions and data with a consistent interface, which may be re-used. It can be, as such, considered to be a small package of information, which is pre-defined and can be used in a consistent manner. This internal structure could be implemented in any way required and does not necessarily have to use a structure based on an object-orientated programming language.

The event bus 130 is logically coupled to the feed output formatters 110, the network transaction data management module 120 and the measurement engine 140, via links 171, 176, and 175 respectively. The measurement output formatter 111 is coupled to the measurement engine 140 via link 173 to receive measurement result events published by the measurement engine 140 at the end of a measurement period/interval.

The network transaction data management module 120 has no internal pre-knowledge of the relationships it needs to build; it creates them as defined by the inputted configuration data. The network transaction data management module 120 takes as its input a feed of transaction events (as wrapped data objects) from the event bus 130, via logical link 176. The source event attribute library 150 can access data kept by the network transaction data management module 120 via link 178 (in the form of a Get Request) and the network transaction data management module 120 can request data from the source event attribute library 150 via the same link (again in the form of a Get Request). The network transaction data management module 120 has no direct link to the feed output formatter 110, or the measurement engine 140; this is all handled by the source event attribute library 150. The network transaction data management module 120 will be further described with reference to FIG. 4 below.

The feed output formatters 110 responds to requests from the network manager and provides enriched transactions in the required output formation; the required output formation could be, but may not be limited to, CSV's (Comma Separated Values). The feed output formatter 110 may then, for example, ask the source event attribute libraries 150 for the current mapping of the IMSI to CLI. The source event attribute libraries 150 then, in turn, ask the network transaction data management module 120 for this information and then pass it back to the feed output formatter 110. Thus, enriched transactions can be produced in the required output format that could not possibly come directly from the input source 160.

The measurement engine 140 provides regular measurement information via the measurement output formatter 111, to the measurement framework 100 and therefore the network manager. The measurement engine 140 may, for example, count different aspects of the transactions coming into the measurement framework 100 via the event bus 130, such as the number of events received over the previous 24 hr period.

Figure 3:
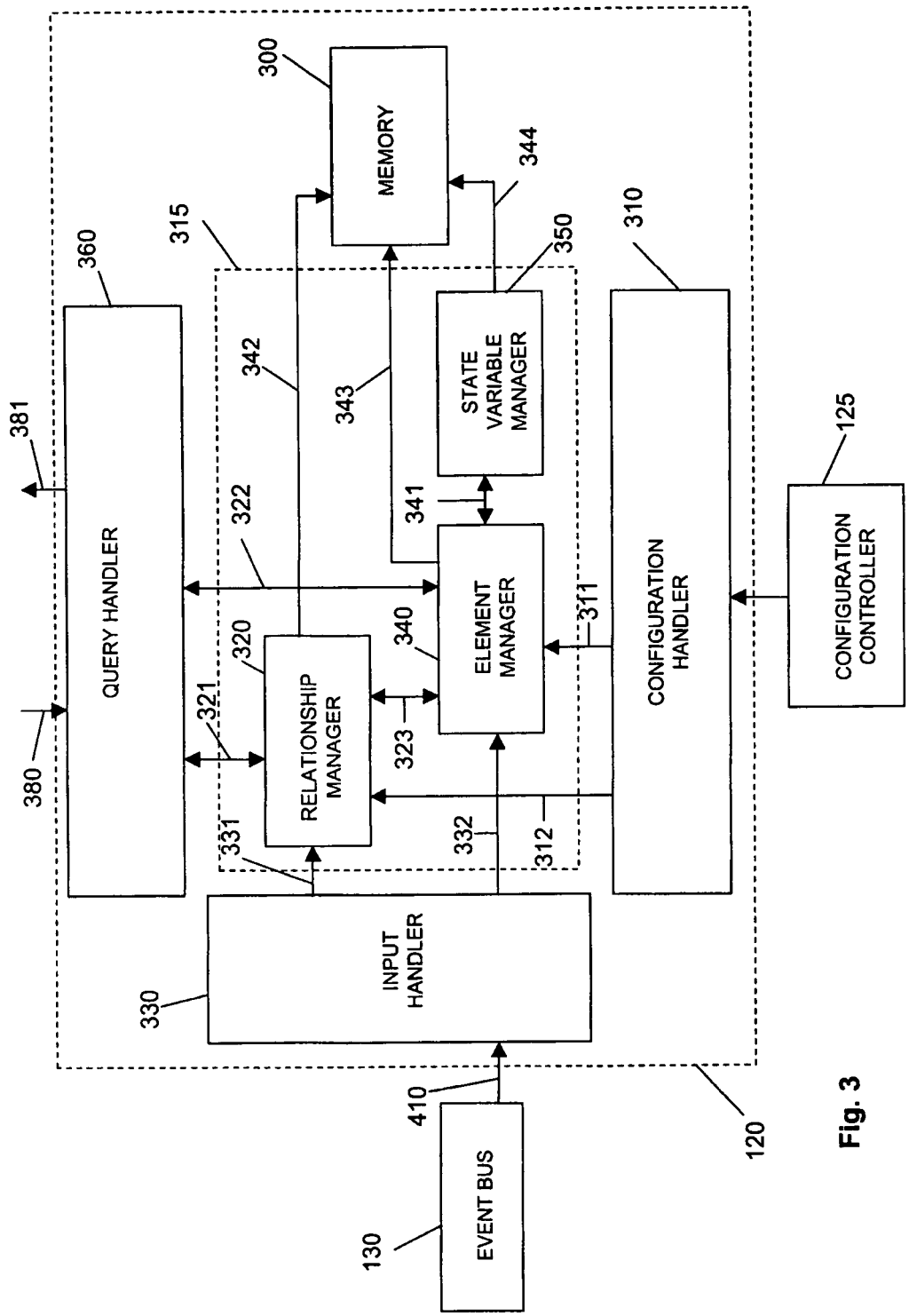
FIG. 3 is a schematic block diagram of the network transaction data management module included in FIG. 2 according to one embodiment of the present invention.

FIG. 3 shows a schematic diagram of a network transaction data management module, according to one embodiment of the present invention. The network transaction data management module 120 comprises a configuration handler 310, a processing module 315, a memory 300, an input handler 330 and a query handler 360. The processing module 315 is composed of a relationship manager 320, an element manager 340, a state variable manager 350

The configuration handler 310 is coupled to the configuration controller and takes instructions in the form of text files. As described above with reference to FIG. 2, the text file provides configuration information that defines the relationships that are to be tracked and the state information to be maintained for the particular network elements that are being monitored. A sample configuration file is given below, using the following example text:

```
PseudoManagement
{
    Relationships
    {
        apnTid
        {
            Attributes
            {
                CreatePDPContext.apn=> GTP.tid;
            }
            Persistence
            {
                Persist: OnUpdate;
                Purge:   OnDelete
                Longevity: Last;
            }
            Output: Never;
        }
    }
    Element sgsn (SGSN_1, SGSN_2, SGSN_3)
    {
        NetworkElementName
        {
            GMM. sgsn;
            SM. sgsn;
            GTP. sgsn;
        }
        StateTracking
        {
            subsWithTunnels : counter
            {
                Increment
                {
                    GTP.imsi + GTP.tid + $CreatePDPContext.event;
                }
                Decrement
                {
                    GTP.imsi + GTP.tid + $DeletePDPContext.event;
                }
                Reset; Never;
            }
        }
    }
    Relationships
    {
        apnTid
        {
            Attributes
            {
                CreatePDPContext.apn=> GTP.tid;
            }
            Persistence
```

-continued

```
            {
                Persist: OnUpdate;
                Purge: OnDelete;
                Longevity:Last;
            }
            Output: Never
        }
      }
    }
}
```

It will be clear to someone skilled in the art, that the configuration file as described above can be implemented in many different ways, the text indicated above being only one possible way. The configuration information itself, of course, could be presented in any form, and does not necessarily have to be in the form of text files.

The configuration handler 310 is logically coupled to the relationship manager 320 and the element manager 340, via links 312 and 311 respectively. The relationship manager 320, the element manager 340 and the state variable manager 350 are logically coupled together via links 323 and 341 respectively.

The element manager 340 manages the list of network elements that are to be monitored, given to it from the configuration files, for example, which GGSN's and/or SGSN's are being monitored in the network. This is described further below with reference to FIG. 6 and the example configuration file above.

Figure 1:
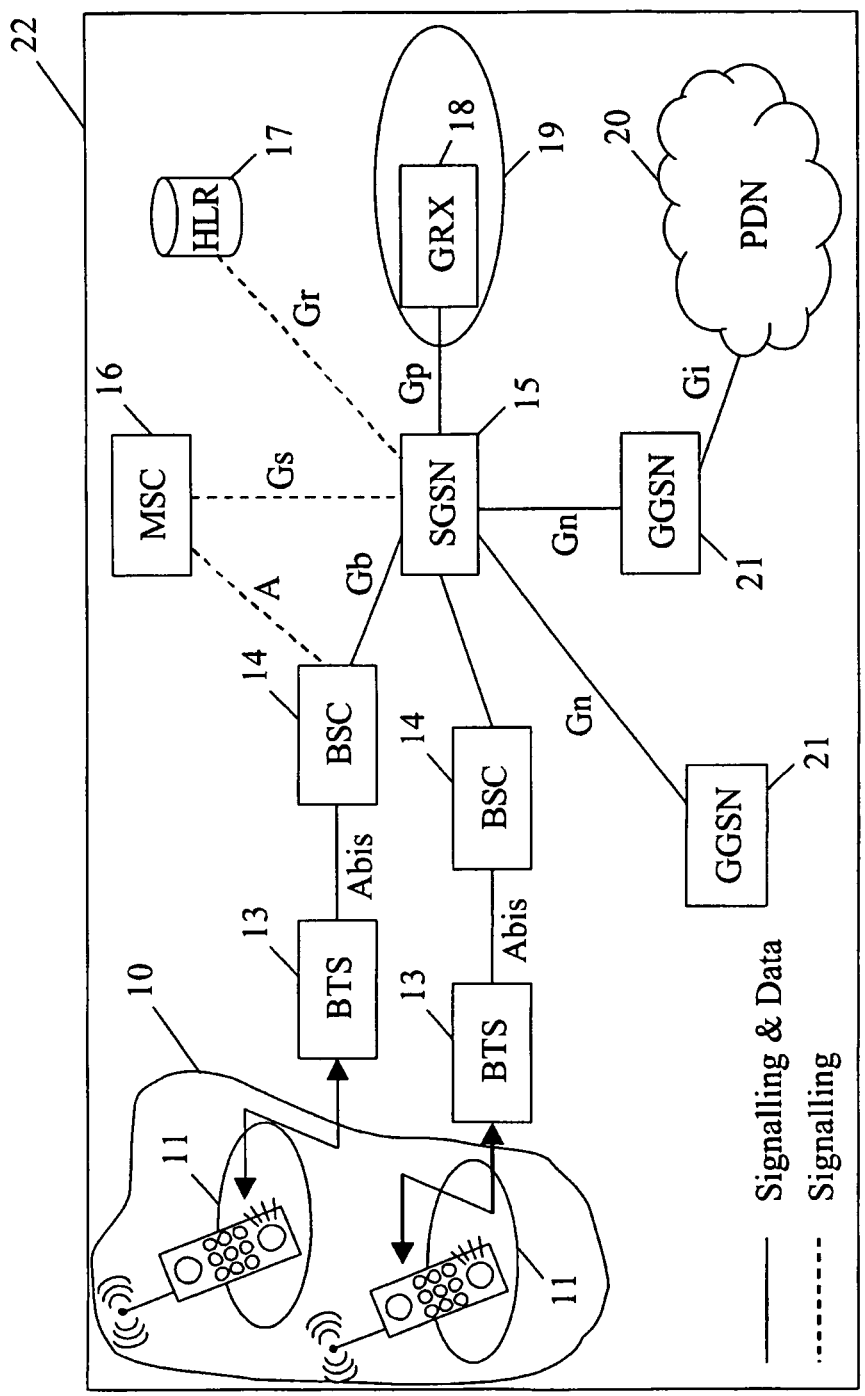
FIG. 1 is an overview of a GPRS network reference model, as known in the art.

The relationship manager 320 builds and monitors relationships by inference, from the available network traffic, using data given to it from the configuration files. This is described further below with reference to FIG. 6 and the example configuration text above. For example, the relationship manager 320 may create and maintain tables of data linking items such as the CLI with a user's IMSI, both of which (as previously described) can be extracted from the GPRS protocols operating over a Gb link (see above with reference to FIG. 1). It will be clear to someone skilled in the art how to obtain such information from the transactions using knowledge of GPRS protocols, as well as the operation of transactions builders, as known in the art.

The state variable manager 350 creates lists of statistics, such as how many subscribers are connected to the network at any one time, or how many IP tunnels have been created. In this example, the state variable manager 350 would "count" using, for example a set, how many IMSI's had sent a "GPRS attach request" message to a particular GGSN, or how many "Create PDP context request" messages had been sent. The configuration files can contain derived rules concerning how to increment and decrement the lists and counters. If a "GPRS attach request" is "successful", then this is likely to be a new user, if a "Create PDP context complete" is received then a new IP tunnel has probably been created. Each "GPRS attach request" contains the IMSI of the mobile user, so by maintaining a set of each unique IMSI on the network and adding an IMSI to the set every time a new one is encountered, or removing an IMSI after a certain timeout period, the number of users actually on the network can be obtained, by counting the current members of the set, at any point in time. This is exactly the same process used for maintaining a list of each "Create PDP context complete" to define, again by inference, how many IP tunnels there are between certain GSNs.

The operation of the state variable manager 350, element manager 340 and relationship manager 320 will be described further below with reference to FIG. 6.

The query handler 360 handles queries from the source event attribute library function of the measurement framework, as described above with reference to FIG. 2, with respect to relationship, network element and state variable information. The input to the query handler 360 is a request 380 and the output is a response in the form of a value (or values) 381.

The input handler 330 takes as its input a live stream of transaction events via link 410 from the event bus 130 of the measurement framework as described with reference to FIG. 2 previously and is logically coupled to the relationship manager 320 and the element manager 340 via links 331 and 332 respectively.

Logical "Query and Response" messages pass between the query handler 360, the state variable manager 350, the element manager 340 and the relationship manager 320, via links 321, 322, 323 and 341, as shown.

Upon reading its configuration from the configuration file, the network transaction data management module 120 constructs an internal representation of a network element, relationship, or state variable that is to be built or monitored according to the data structures outlined below with reference to FIG. 4. This internal representation is then stored in the memory 300 via links 342, 343 and 344 from the relationship manager 320, the element manager 340 and the state variable manager 350, respectively.

Figure 4:
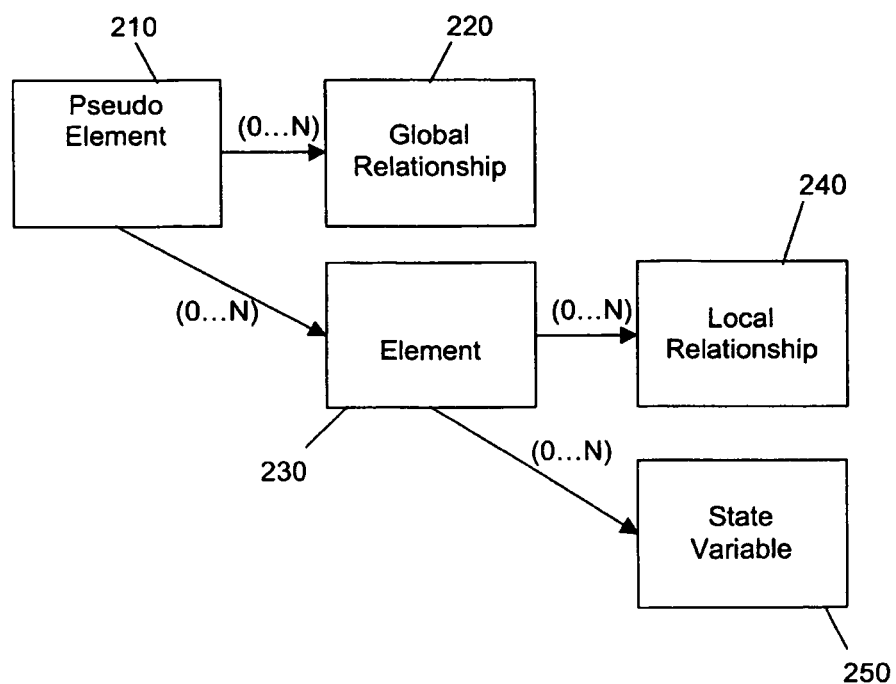
FIG. 4 is an outline of the internal data structures as may be constructed by the network transaction data management module of FIG. 3 according to one embodiment of the present invention.

FIG. 4 shows a representation of the data structures, constructed internally by the network transaction data management module 120, according to one embodiment of the present invention. A single top level object, pseudo element 210, acts as a "container" for 0 or more (0 . . . N) global relationship objects 220 and 0 or more (0 . . . N) element objects 230. Each element object 230 may, in turn contain 0 or more (0 . . . N) local relationship objects 240 and possibly 0 or more state variable objects 250. Local relationship objects are required, as there may some relationships that operators do not want to track globally, but that are pertinent to a specific network element. The structure shown in FIG. 4, of course, relates to the structure of the example configuration file, as described previously.

Figure 5:
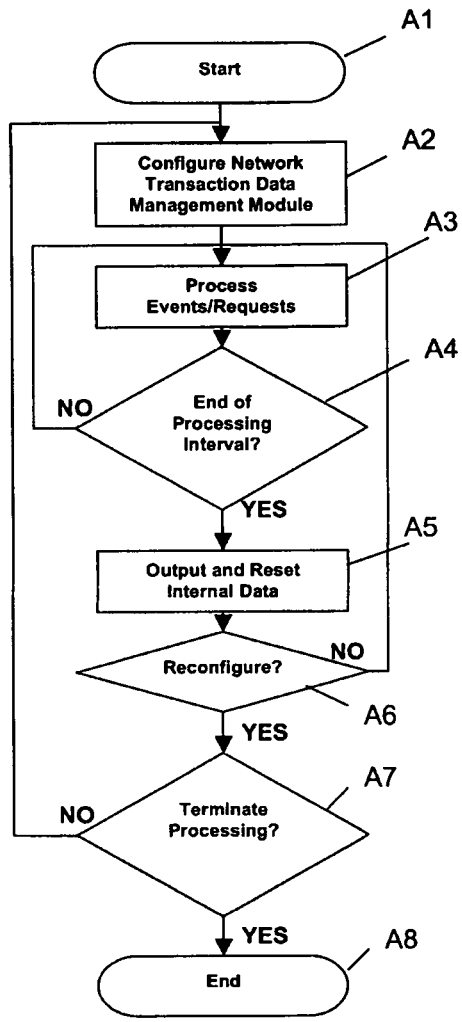
FIG. 5 is a flow diagram showing the high level flow of processing by the measurement framework of FIG. 2 with specific reference to network transaction data manager of FIG. 3.

A network transaction data management module 120 may execute continuously as described below with reference to the flow chart of FIG. 5, according to one embodiment of the present invention. The following is a description of the actions depicted in the flow chart of FIG. 5:

A1 Start

A2 Configure network transaction data management module. The network transaction data management module is configured by the measurement framework using configuration information.

A3 Process Events/Requests. The network transaction data management module processes a stream of transaction events from the event bus. The network transaction data management module also handles requests for state variable information, network element information or relationship information from a source event attribute library as previously described. The transaction events that are passed to the network transaction data management module are processed according to the flow charts described below and shown in FIG. 6.

A4 End of Processing Interval? The network transaction data management module checks whether the end of the current measurement interval has been reached. It doesn't matter whether or not there are more events waiting to be processed.
YES: Go to A5
NO: Go to A3

A5 Output & Reset Internal Data. At intervals determined by the measurement framework the network transaction data management module is instructed to perform any output and internal reset operations as dictated by its configuration.

A6 Reconfigure? If the measurement framework has a pending reconfiguration event then the network transaction data management module will be instructed to reconfigure itself before resuming transaction event processing.
YES: Go to A7
NO: Go to A3

A7 End of Processing? This is the means for exiting out of the pseudo measurement operation.
YES: Go to A8
NO: Go to A2

A8 Exit

Figure 6:
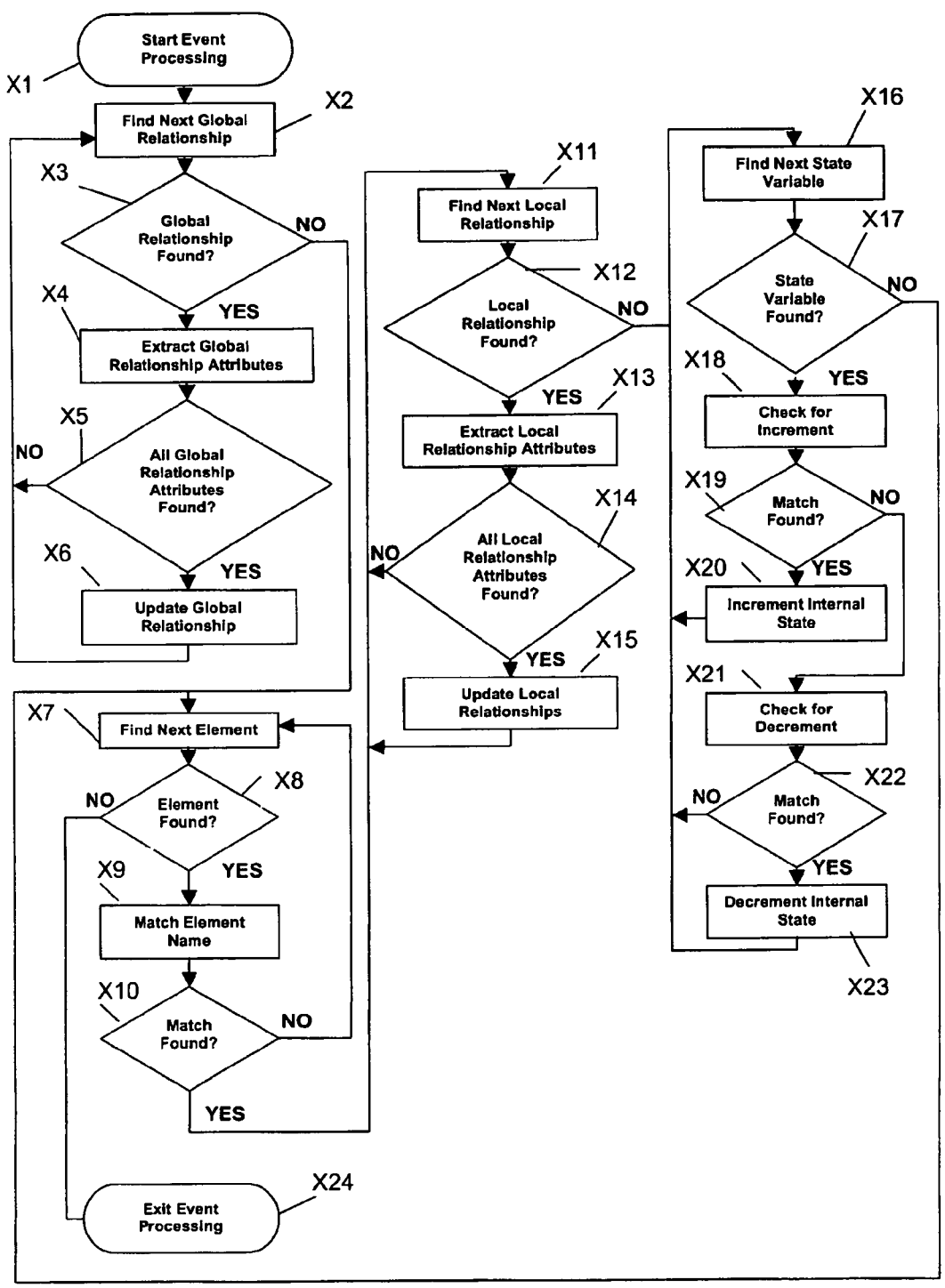
FIG. 6 is a flow diagram showing the processing of transaction events by the network transaction data management module of FIG. 3, according to one embodiment of the present invention.

The flow chart in FIG. 6, according to one embodiment of the present invention, describes the complete operation that is performed for each transaction that comes in from the event bus and therefore executes once only for each event.

The process as described in FIG. 6 starts at X1 "Start Event Processing" and continues with the following actions, which form a set of nested loops:

X1 Start Event Processing.

X2 Find Next Global Relationship—The relationship manager looks for the next global relationship in the transaction event being analyzed according to the criteria set by the configuration file.

X3 Global Relationship Found?—If the relationship manager finds a global relationship, the operation moves on to X4; otherwise it moves on to X7, where the element manager looks for a network element according to the criteria set by the configuration data.

X4 Extract Global Relationship Attributes—Extracts relationship attributes from the current transaction event, according to data given in the example configuration file, for example this could be an "APN" attribute from a "CreatePDPContext" event. Store attribute in local memory.

X5 All Global Relationship Attributes Found? This checks whether all attributes required for the particular relationship being considered have been found in the current transaction event?
YES Go to X6
NO go back to X2 to look for the next Global Relationship.

X6 Update Global Relationships. Update the current stored relationship information with the new information obtained from the current transaction event. The flow then moves back to X2 to look for the next Global Relationship and the loop is repeated until no more Global Relationships are found and the flow moves from X3 to X7.

X7 Find Next Element—The element manager looks for the next network element in the transaction event being analyzed according to the criteria set by the configuration file.

X8 Element Found?—If the element manager finds a network element according to the criteria, the operation moves on to X9; otherwise it moves to X24, where the procedure ends for the particular transaction event being processed.

X9 Match Element Name. The network element name given in the configuration data must be matched to the network element name in the current transaction event.

X10 Match found? Has a match been found?
YES Go to X11
NO go back to X7 and look for the next Network Element.

X11 Find Next Local Relationship. For each matching element, the element manager looks for the next local relationship within the network element in the transaction event being analyzed according to the criteria set by the configuration file.

X12 Local Relationship Found?—If the element manager finds a local relationship, the operation moves on to X13; otherwise it moves on to X16, where the state variable manager looks for a state variable according to the criteria set by the configuration data.

X13 Extract Local Relationship Attributes—Extract local relationship attributes from current transaction event, store in local memory. The difference here compared to X4 is that only a filtered view of transaction events is actually being seen, that is transaction events that had a matching network element name in X10 previously. As previously mentioned, there are some relationships that may not need to be tracked globally across the whole network, but that may relate to specific network element.

X14 All Local Relationship Attributes Found? This checks whether all attributes required for the particular relationship being considered have been found in the current transaction event?
YES Go to X15
NO go back to X11 to look for the next Local Relationship.

X15 Update Local Relationships. Update the current stored relationship information with the new information obtained from the filtered transaction event. The flow then moves back to X11 to look for the next Local Relationship and the loop is repeated until no more Local Relationships are found and the flow moves from X12 to X16.

X16 Find Next State Variable—The state variable manager looks for the next state variable in the transaction event being analyzed according to the criteria set by the configuration file.

X17 State Variable Found?—If the state variable manager finds a state variable according to the criteria, the operation moves on to X18; otherwise it moves back to X7, where the procedure looks for the next Network Element.

X18 Check for Increment. Check that the rule, as given in the example configuration data, for incrementing a state variable list matches information in the current transaction event.

X19 Match found?
YES Go to X20
NO Go to X21 to check for a Decrement.

X20 Increment Internal State. The flow then moves back to X16 to look for the next state variable.

X21 Check for Decrement. Check that the rule given, via the configuration file, for decrementing a state variable list matches information in the current transaction event.

X22 Match Found?
YES Go to X23
NO Go back to X16 to look for the next state variable.

X23 Decrement Internal state. The flow then moves back to X16 to look for the next state variable.

X24 Exit Event Processing. If no more network elements are found according to the criteria, the procedure ends for the particular transaction event being processed.

This embodiment of the invention allows a network manager to model the state of network elements with a high degree of accuracy, but based on, or inferred from, only the information contained within the available transactions built from the network traffic which is being monitored. In particular, it allows the network manager to obtain the same results that would previously have required direct access to an operator's network elements, but without the use of state machines, or the use of deciphering keys.

Furthermore, the present embodiment of the invention can enable a network manager to enrich existing data feeds for use by other frameworks within the network manager.

It will be appreciated that although only one particular embodiment of the invention has been described in detail, various modifications and improvements can be made by a person skilled in the art without departing from the scope of the present invention.

The invention claimed is:

1. Apparatus for monitoring a telecommunications network having a plurality of users and network elements, comprising:
   a network transaction data management module having:
   a first input for receiving configuration information for configuring the module to analyze transaction event data according to predetermined criteria and required result structures;
   a second input for receiving the transaction event data, wherein the transaction event data is built from passively monitored related data messages exchanged between two network devices on the network, wherein the two network devices are separate from the network transaction data management module;
   at least one output formatter coupled to receive the transaction event data and add additional data not available at the second input to provide enriched transaction event data;
   a processor configured to construct a model of internal states of one or more predetermined network devices and their respective relationships from the configuration information and to update each model with a status of state variables reflecting the internal states of the one or more predetermined network devices, obtained by analyzing the transaction event data built from passively monitored related data messages exchanged between two network devices;
   a memory for storing the configuration information and each updated model; and,
   a result interface for receiving queries, for obtaining appropriate result information for the queries from the memory and for outputting the appropriate result information.

2. An apparatus according to claim 1, further comprising a transaction event builder having one or more inputs for receiving data message information from monitoring probes distributed across the network, a compiler for compiling transaction event data from the received data message information based on related data messages and an output coupled to the second input of the network transaction data management module for providing transaction event data.

3. An apparatus according to claim 1, wherein the transaction event builder is at a remote location from the network transaction data management module.

4. An apparatus according to claim 1, wherein the processor comprises a global network relationship data manager for analyzing the transaction event data to produce result information comprising global relationships between users based on predetermined global relationship attributes.

5. An apparatus according to claim 1, wherein the processor comprises a network element data manager for analyzing the transaction event data to produce result information comprising local relationships for each predetermined network element based on predetermined local relationship attributes.

6. An apparatus according to claim 1, wherein the processor comprises a network state variable data manager for analyzing the transaction event data to produce result information comprising the model of internal states and the status of the state variables for each predetermined network element.

7. An apparatus according to claim 1, further comprising a configuration controller for providing configuration information to the network transaction data management module.

8. An apparatus according to claim 7, wherein the network transaction data management module further comprises a configuration handler having an input for receiving the configuration information and at least one output coupled to the processor for configuring the processor according to the configuration information.

9. An apparatus according to claim 1, further comprising an event bus having an input for receiving the transaction event data and being coupled to provide the transaction event data to the network transaction data management module.

10. An apparatus according to claim 9, further comprising a measurement engine coupled to receive the transaction event data from the event bus for measuring statistics of the transaction event data.

11. An apparatus according to claim 1, further comprising at least one source event attribute library coupled to the network transaction data management module and the output formatter, the output formatter requesting the source event attribute library for information regarding the transaction event data and the source event attribute library querying the network transaction data management module to obtain the appropriate result information from the network transaction data management module and responding to the output formatter based on the received appropriate result information.

12. An apparatus according to claim 1, wherein the output formatter comprises a feed output formatter and the apparatus further comprises a measurement output formatter.

13. An apparatus according to claim 11, wherein the source event attribute library comprises a factory portion for generating labels for the transaction event data and an access portion for allowing direct access to fields in the transaction event data.

14. An apparatus according to claim 11, wherein the measurement engine is coupled to the source event attribute library to enable it to communicate with the network transaction data management module.

15. A method of monitoring a telecommunications network having a plurality of users and network devices, the method comprising:
   receiving configuration information for configuring a module to analyze transaction event data according to predetermined criteria and required result structures;
   receiving the transaction event data at the module, wherein the transaction event data is built from passively monitored related data messages exchanged between two network devices on the network separate from the module;
   adding additional data not available in the received transaction event data to the transaction event data to provide enriched transaction event data;
   constructing a model of internal states of one or more predetermined network devices and their respective relationships from the configuration information and updating each model with a status of state variables of the one or more predetermined network devices obtained by analyzing the received transaction event data built from passively monitored related data messages exchanged between two network devices;

storing the predetermined criteria, the required result structures and each updated model; and outputting appropriate result information in response to received queries.

16. A method of monitoring a telecommunications network according to claim 15, wherein analyzing the received transaction event data comprises analyzing the transaction event data to produce result information comprising global relationships between users based on predetermined global relationship attributes.

17. A method of monitoring a telecommunications network according to claim 15, wherein analyzing the received transaction event data comprises analyzing the transaction event data to produce result information comprising local relationships for each predetermined network element based on predetermined local relationship attributes.

18. A method of monitoring a telecommunications network according to claim 15, wherein analyzing the received transaction event data comprises analyzing the transaction event data to produce result information comprising the model of internal states and the status of the state variables for each predetermined network element.

* * * * *